United States Patent [19]
Sullivan

[11] Patent Number: 5,741,041
[45] Date of Patent: Apr. 21, 1998

[54] REAR COVER OF GOLF CARTS

[76] Inventor: Diane Sullivan, 609 Congressional Way, Deerfield Beach, Fla. 33442

[21] Appl. No.: 774,391

[22] Filed: Dec. 30, 1996

Related U.S. Application Data

[63] Continuation of Ser. No. 555,612, Nov. 9, 1995, abandoned.

[51] Int. Cl.$^6$ ...................................................... B60P 7/02
[52] U.S. Cl. .................... 296/100; 296/141; 135/88.09; 150/166
[58] Field of Search .................... 296/77.1, 79, 80, 296/83, 100, 102, 138, 140, 141, 143, 145; 135/88.01, 88.02, 88.09; 280/DIG. 5, 159; 150/159, 166

[56] References Cited

U.S. PATENT DOCUMENTS

| | | | |
|---|---|---|---|
| 726,906 | 5/1903 | Gordon | 296/83 |
| 811,039 | 1/1906 | Daugherty | 296/83 |
| 835,134 | 11/1906 | Harter | 296/83 X |
| 864,952 | 9/1907 | Charles | 296/83 |
| 4,013,315 | 3/1977 | West | 296/83 |
| 4,332,415 | 6/1982 | Williams | 296/213 |
| 5,010,941 | 4/1991 | Ross, Jr. et al. | 280/DIG. 5 X |
| 5,310,235 | 5/1994 | Seymour et al. | 296/77.1 |

Primary Examiner—Dennis H. Pedder
Attorney, Agent, or Firm—Joseph Zallen

[57] ABSTRACT

A portable, removable rear cover for an electric golf cart in the form of a flexible, thin, lightweight, weather-resistant sheet. The sheet has an upper, transparent plastic panel and a lower, woven fabric panel. Shock cords are provided for attaching the sheet to both the upper and lower portions of a golf cart frame so as to cover golf clubs stored in the well of the cart. Grommets and loops are provided in the upper portion so that the cover can be used with more commercially available golf carts.

4 Claims, 3 Drawing Sheets

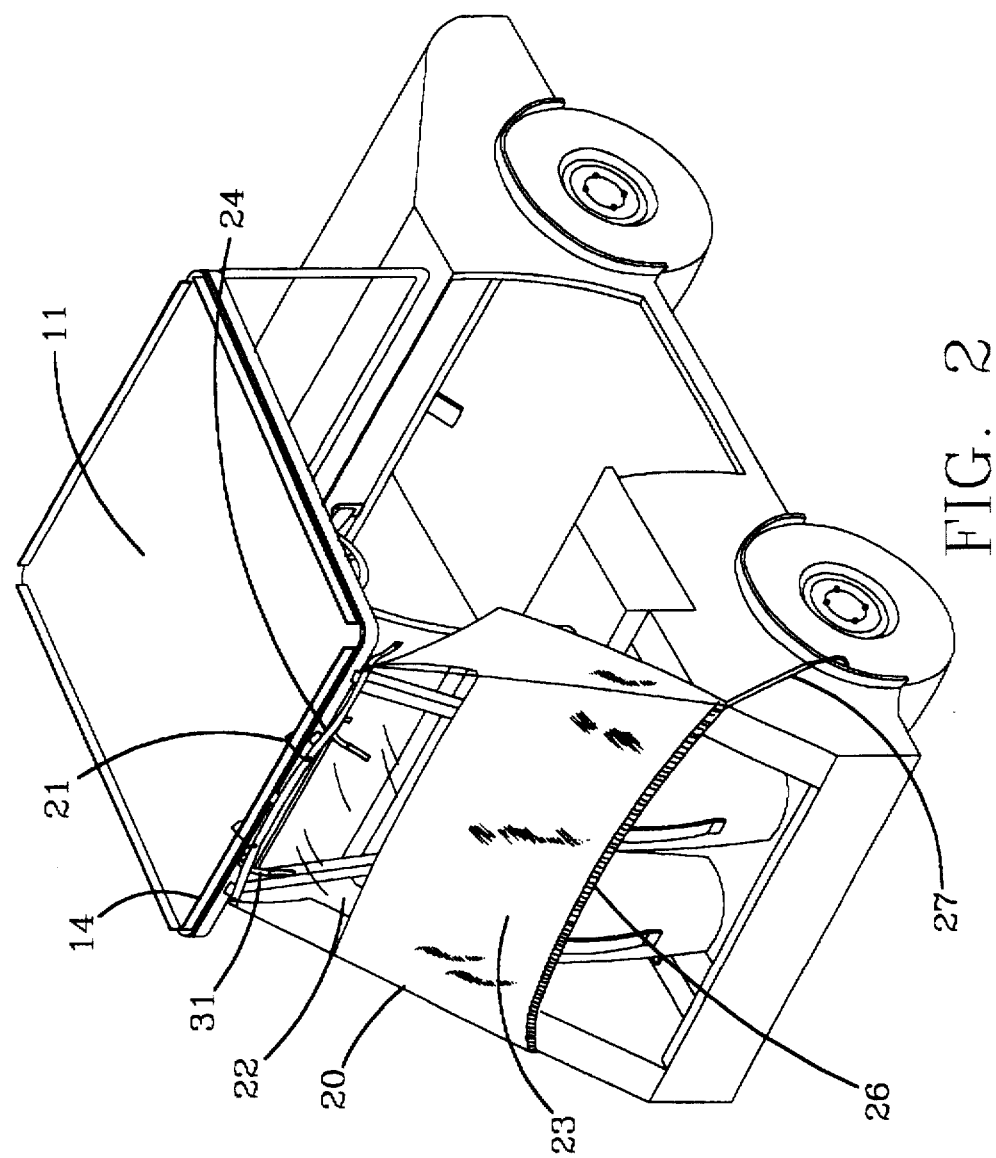
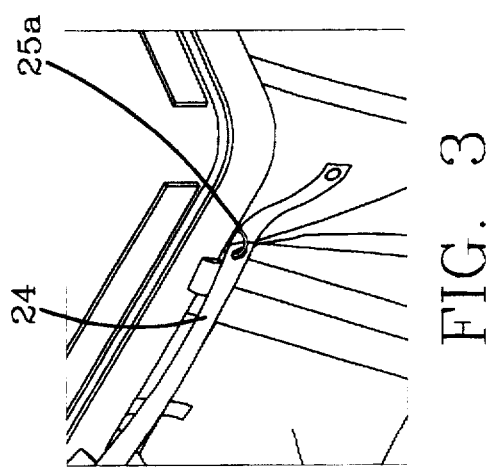

REAR COVER OF GOLF CARTS

This is a continuation of patent application Ser. No. 08/555,612, filed Nov. 9, 1995, now abandoned and which is incorporated herein by reference.

BACKGROUND OF INVENTION

This invention relates to a rear cover for electric golf carts.

A wide variety of golf cart covers have been described in the prior art, as for example, the following:

U.S. Pat. No. 5,310,235, Seymour et al., May 10, 1994, describes an easily foldable transparent weather-shield which completely surrounds the golf cart.

U.S. Pat. No. 5,259,656, L. W. Carroll, Nov. 9, 1993, describes a rolled-up enclosure having roll-up panels and a top panel.

U.S. Pat. No. 5,146,967, J. W. Chapman, Sep. 15, 1992, is limited to covers for golf bags.

U.S. Pat. No. 5,010,941, Ross, Sr. et al., Apr. 30, 1991, describes a curtain which extends from the roof and is resiliently secured to the golf bags.

U.S. Pat. No. 4,830,037, W. T. Held, May 16, 1989, describes a somewhat complex canopy assembly which includes a special frame.

U.S. Pat. No. 4,795,205, C. E. Gerber, Jan. 3, 1989, utilizes horizontal upper tracks and vertical lower tracks with a windshield having rollers slidable in the tracks.

U.S. Pat. No. 4,621,859, K. N. Spicher, Nov. 11, 1986, utilizes a pipe frame which holds transparent weather-resistant sheets.

U.S. Pat. No. 4,013,315, G. L. West, Mar. 22, 1977, describes panels attachable by suction cups and hooks.

In accordance with the present invention a rear cover for a golf cart is described which is simpler, lighter, and easier to use than the prior art.

Further objects and advantages of the invention will be apparent from the description and claims which follow taken together with the appended drawings.

BRIEF SUMMARY OF INVENTION

The invention is a rear cover for an electric golf cart. It comprises a flexible, thin, light-weight, weather-resistant sheet having an upper, transparent, plastic panel and a lower, woven fabric panel. A first shock cord is provided for attaching the upper portion of the sheet to the upper frame of a golf cart. On the lower edge portion of the sheet is a second shock cord for attaching the sheet to the body of the cart.

In view of the wide variety of sizes and shapes of the upper frame, the present invention preferably has a number of grommets and loops at its upper edge to permit the first shock cord to be used with substantially all commercially available golf carts having an upper frame. With some frames, the cord is passed through the loop and attached to the frame on the outside. With other frames, there are tabs on each end of the upper edge of the sheet which extend inwardly from the frame and have grommets to which the first cord is attached.

BRIEF DESCRIPTION OF DRAWINGS

FIG. 2 is a similar view showing the cover of this invention unrolled and attached to the body of the golf cart so as to cover the golf clubs.

FIG. 3 is an enlarged partial view of FIG. 2.

SPECIFIC EXAMPLE OF INVENTION

Figure 1:
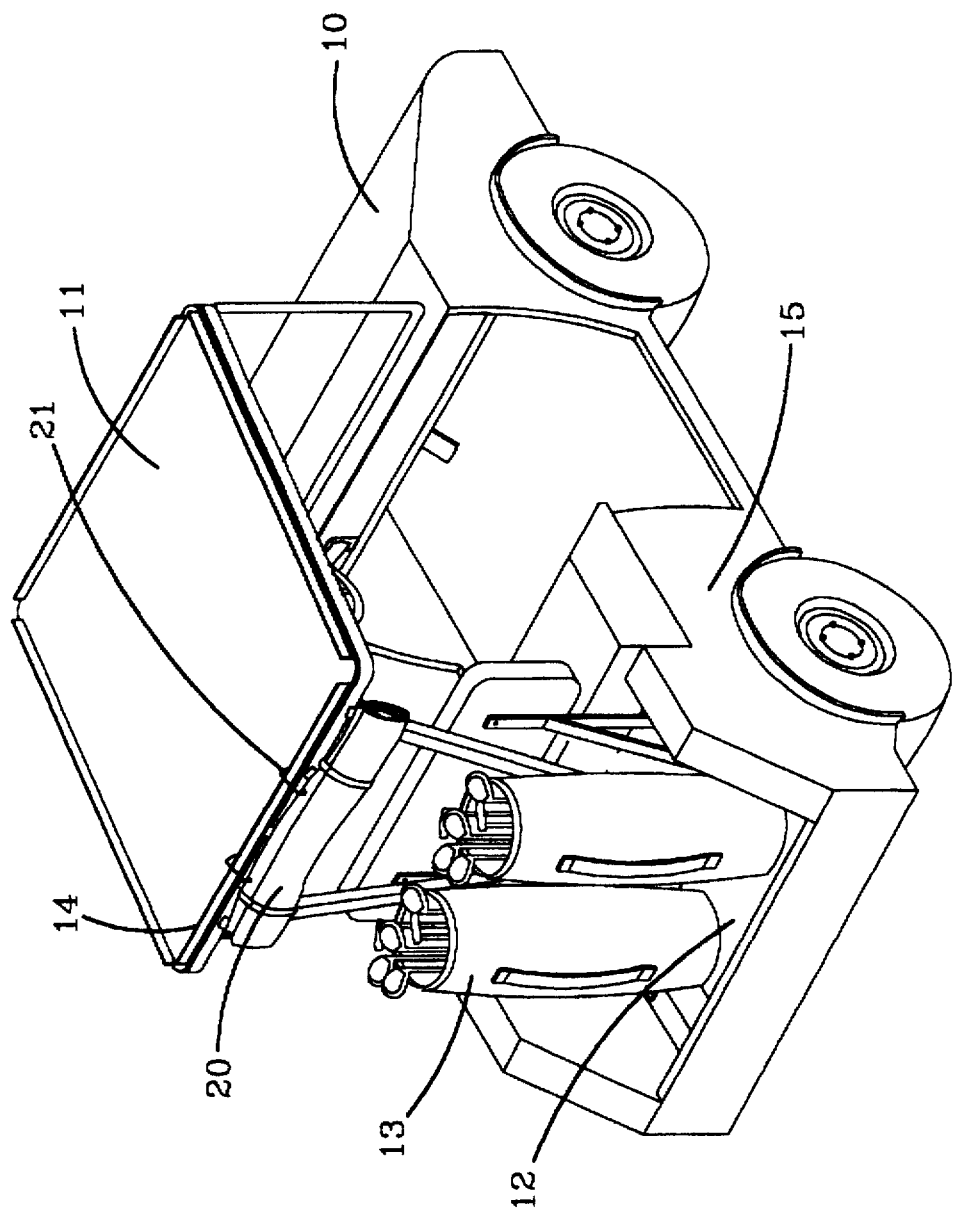
FIG. 1 is a perspective view of a golf cart showing an example of this invention rolled up and attached to the upper frame of the roof of the golf cart.

Referring now to the drawings, an electric golf cart 10 is illustrated having a rear golf club storage well 12, an upper frame 14 and a body portion 15, a roof 11 covering the upper frame, and a golf cart cover 20 made in accordance with this invention. The golf clubs are stored in the well 12 with the golf cart cover 20 attached to the upper frame portion 14. In FIG. 1 the cover is rolled up. In FIG. 2 the golf cart cover 20 has now been pulled down and is attached at its lower edge to the body 15.

Figure 4:
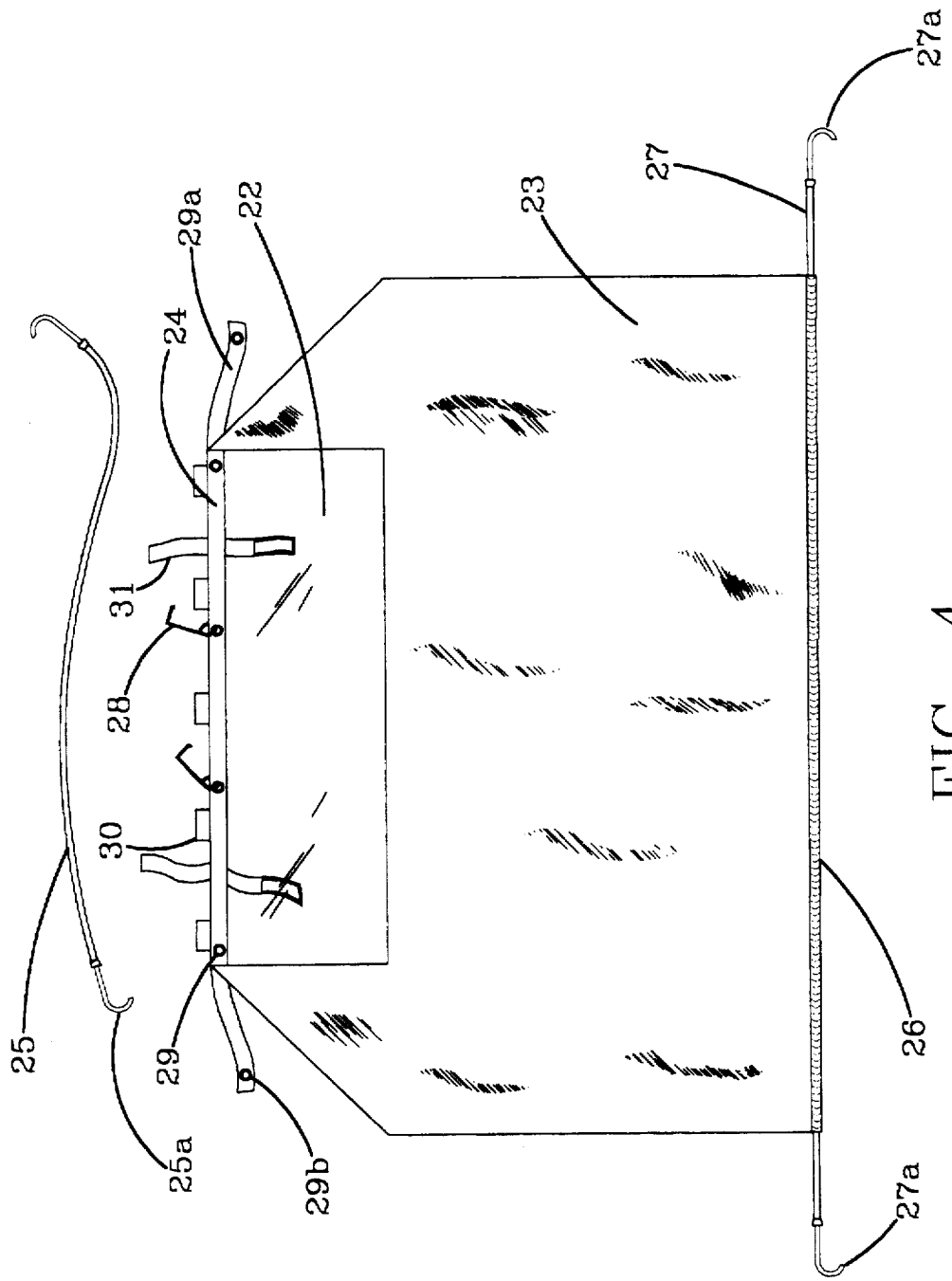
FIG. 4 is a plan view of the invention unattached and opened up flat.

As shown in FIG. 4, the golf cart cover of this invention comprises a thin, flexible, sheet including an upper plastic transparent section 22 attached to a woven fabric section 23. The bottom edge of the cover has an elastic band 26 to which are attached shock cords 27 having hooks 27a which hook on to the body 15. The upper portion of the cover is used with a shock cord 25 with hooks 25a for attaching it to the upper frame portion. The upper portion has special features for adapting the cover to a golf cart of different-shaped upper frame widths. These features include grommets 29 extending through the upper seam 24, tubular portions or loops 30 attached to the upper seam 24, and tabs 29a with grommets 29b. Hooks 28 are attached to the seam 24 for holding the rolled-up cover onto the frame and Velcro strips 31 are attached for keeping the rolled-up cover from unraveling.

When the grommets and tabs are used, the tabs extend around the frame to the inside where the grommets 29b are used to anchor the shock cord 25. When the tubular portions are used, the cord 25 extends through them and is anchored to the body 15. Shock cords which may be used in this invention include bungee cords.

In one example of cover dimensions of this invention the lower width is about 58 inches, the upper width about 34 inches, the transparent plastic panel about 34 inches wide and 12 inches high, and the woven polyester fiber panel about 21 inches high and about 58 inches wide. One useful form of such fiber is Dacron polyester. Use of lightweight Dacron sailcloth, as for example 6 oz. Dacron sail cloth, results in a lightweight cover of less than 16 ounces total weight.

I claim:

1. A separate, removable, rear cover for a golf cart having a body portion attached to an upper frame, said body portion containing a rear area for storage of golf clubs; said cover comprising a flexible, thin, lightweight, removable weather-resistant sheet defined as having an upper edge, a bottom edge, unattached side edges, and an upper seam; said sheet having an upper transparent, plastic panel and a lower woven fabric panel; first shock cord means being provided for attaching the upper edge of said sheet to said upper frame; second shock cord means being provided for attaching the lower edge of said sheet to said body portion; said cover being characterized in that when extended, it covers said rear area, and it is capable of being rolled up and attached in rolled-up form to said upper frame by hooks attached to said upper seam. and has means for keeping the rolled-up cover from unraveling after being rolled up.

2. The rear cover of claim 1 wherein said fabric panel is made of polyester fiber.

3. The rear cover of claim 1 wherein said lower edge includes an elastic band to which shock cords are attached.

4. The rear cover of claim 1 wherein said upper edge of said sheet includes spaced grommets and spaced tubes for use with said first shock cord means.

* * * * *

UNITED STATES PATENT AND TRADEMARK OFFICE
CERTIFICATE OF CORRECTION

PATENT NO. : 5,741,041
DATED : April 21, 1998
INVENTOR(S) : Diane Sullivan

It is certified that error appears in the above-identified patent and that said Letters Patent is hereby corrected as shown below:

On the title page, item [54] and column 1, the title should read--
Rear Cover for Golf Carts--.

Signed and Sealed this

Twentieth Day of April, 1999

*Attest:*

Q. TODD DICKINSON

*Attesting Officer*  *Acting Commissioner of Patents and Trademarks*